United States Patent [19]

Lagarde

[11] 4,164,987

[45] Aug. 21, 1979

[54] CONTROL DEVICE FOR THE DECELERATION OF A HEAVY VEHICLE

[75] Inventor: Roger Lagarde, Aulnay-Sous-Bois, France

[73] Assignee: Labavia - S.G.E., Paris, France

[21] Appl. No.: 757,513

[22] Filed: Jan. 7, 1977

[30] Foreign Application Priority Data

Jan. 13, 1976 [FR] France .............................. 76 00716

[51] Int. Cl.² ............................................... B60T 8/04
[52] U.S. Cl. .................................. 180/271; 180/197; 188/156; 188/267; 303/97; 303/99
[58] Field of Search ................ 180/82 D, 82 R, 14 R, 180/103 BF; 303/97, 99, 93, 95, 103, 104, 23 R; 188/156, 267

[56] References Cited

U.S. PATENT DOCUMENTS

| | | | |
|---|---|---|---|
| 2,985,489 | 5/1961 | Stelzer | 303/23 R |
| 3,599,154 | 8/1971 | Carol | 303/95 X |
| 3,776,357 | 12/1973 | Arai | 180/82 R |
| 3,843,210 | 10/1974 | Portas | 303/97 |
| 3,871,466 | 3/1975 | Bessière | 188/267 X |
| 3,892,952 | 7/1975 | Shibata | 303/95 X |

Primary Examiner—John P. Silverstrim
Attorney, Agent, or Firm—Robert E. Burns; Emmanuel J. Lobato; Bruce L. Adams

[57] ABSTRACT

The invention relates to control devices for electrical, hydraulic or other forms of decelerator for heavy vehicles. For the purpose of avoiding skidding of the wheels of the vehicles when empty, in the case of a false maneuvre by the driver, the devices comprise means for automatically neutralizing the brake when the deceleration of the vehicle exceeds a predetermined level of the order of 1–3 m/s².

16 Claims, 3 Drawing Figures

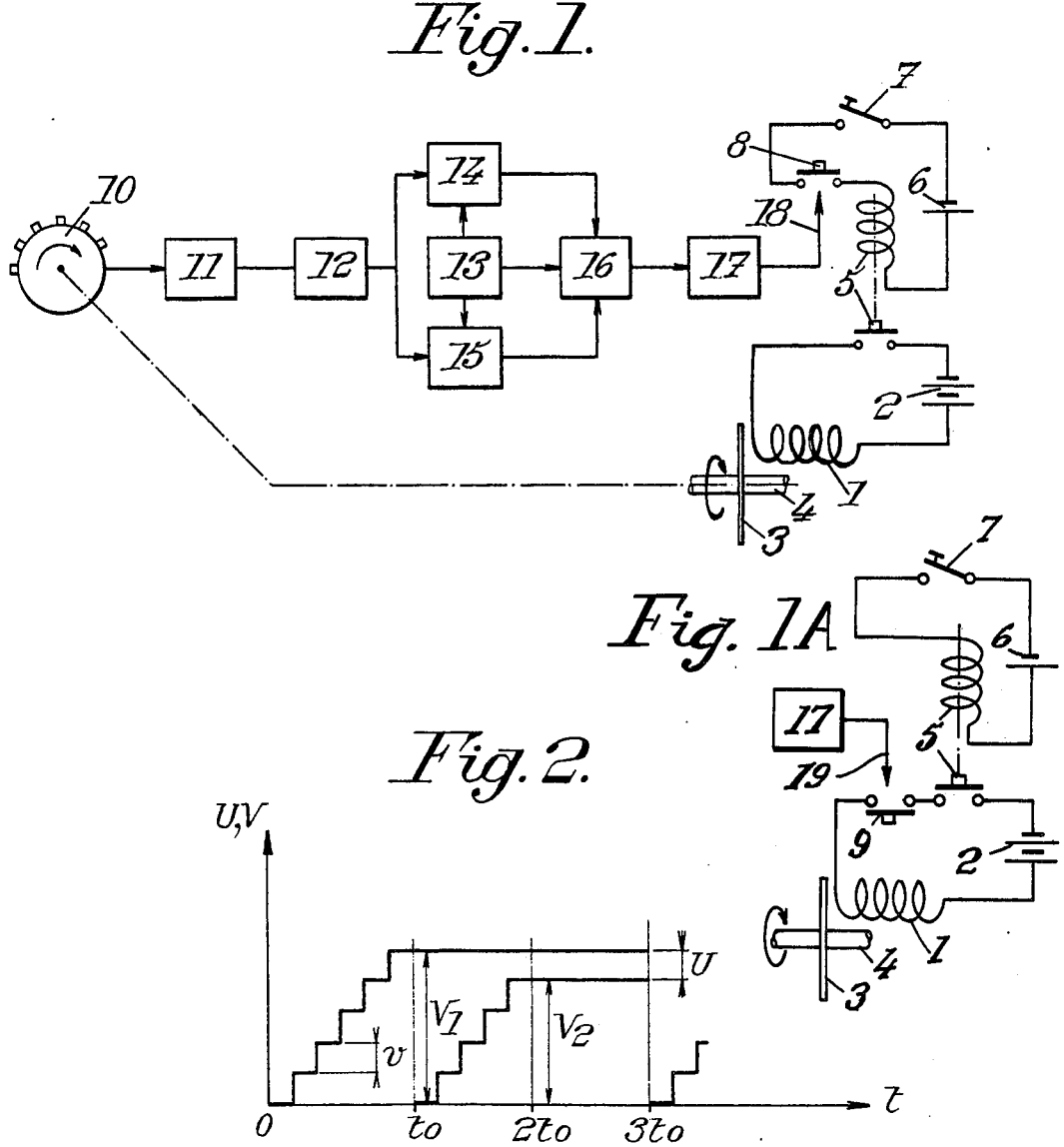

CONTROL DEVICE FOR THE DECELERATION OF A HEAVY VEHICLE

The invention relates to control devices for the decelerators of heavy goods vehicles, that is to say apparatus for the purpose of braking such vehicles to a slow but non-zero speed, or at least for reducing or annuling their acceleration during a descent by transforming part of the kinetic energy of the vehicles into heat without intervening rubbing, the apparatus bringing into play notably the creation of eddy currents (electric decelerators), or the forced circulation of a liquid (hydraulic or hydrokinetic decelerators) or the at least partial closing of the silencer.

In other words the decelerators considered here are not friction brakes, which are also required on the vehicles under consideration for the purpose of ensuring intense braking to bring about an eventual halt.

It is known that over-energetic braking can, under certain conditions—depending in particular upon the ground covering, the atmospheric conditions, the load of the vehicle and the wear of the tires—lead to the seizing of one at least of the wheels of the vehicle.

Such a seizing can lead to sliding or skidding of the wheel, which can be a source of accidents.

In order to avoid this inconvenience, it has already been proposed to neutralize automatically at least a part of the friction braking to avoid such seizings.

The maximum decelerations which can be obtained by such friction braking are of course much more intense than those which are susceptible of being created by the actuation of a decelerator: thus, for a heavy goods vehicle fully charged it is usual for the friction brakes to be able to ensure a deceleration of the order of 7 m/s$^2$ while the deceleration provided by the decelerator acting with full force rarely exceeds 1 to 2 m/s$^2$.

As a result of the substantial disproportion between the levels of the two types of deceleration under consideration, automatic neutralization of the deceleration due to the decelerator alone has not up to this date been considered for avoiding the risks of skidding, such a deceleration not having been held sufficient for the creation itself of such risks.

It has been found, in accordance with the invention, that a part of the deceleration capable of being applied to the wheels of a heavy, goods vehicle by the simple actuation of its decelerator increases in considerable proportion when the load of the vehicle is considerably reduced, the deceleration under consideration being capable of exceeding 5 m/s$^2$ for an empty heavy goods vehicle. It has also been found that this reduction in the load of the heavy goods vehicle is accompanied by a strong reduction of the adherence of the wheels of the vehicle to the ground.

As a result of this double effect, when the vehicle is driven empty or lightly loaded, the actuation of the decelerator can, on its own, originate skids in the case of a false manoeuvre on the part of the driver.

The invention is aimed principally at overcoming this inconvenience.

The invention consists essentially in neutralizing automatically the decelerator when the deceleration of the vehicle when empty or lightly loaded exceeds a predetermined level, above which the vehicle is at risk of skidding, the means used for assuring this automatic neutralization of the decelerator being independent of any means otherwise provided for releasing the friction brakes of the said vehicle to release a seizing of a wheel of the vehicle.

By the expression "lightly loaded" is meant a load appreciably less than a half-load of the vehicle and more generally less than a quarter of the load.

The value of the predetermined level is advantageously within the range 0.8 to 3 m/s$^2$ being for example of the order of 1 m/s$^2$ for an articulated vehicle or of the order of 1.5 m/s$^2$ for a trailer.

The control device for the decelerator under consideration includes for this purpose, preferably:
  a tachymetric detector suitable for determining a first electrical term which varies in the same sense as the speed of the vehicle,
  means for determining from the first term a second electrical term which varies in the same sense as the variation of the said speed with time,
  and means responsive to the exceeding of a predetermined level by the second term and arranged to prohibit or stop the actuation of the decelerator when this level is exceeded by the second term and on the contrary to allow or to re-establish anew such actuation when the second term falls back below said level.

In the preferred embodiments recourse is had to one and/or other of the following features:
  the first term is constituted by a train of measurement pulses of which the number per unit time is proportional to the speed of the vehicle, and the means for providing the second term comprise: a generator (13) of time pulses, two memories suitable to determine electric potentials proportional to the number of the measurement pulses applied to them during a given time, and a comparator suitable for providing an electrical signal which is a function of the difference between or the quotient between two potentials applied to it, the assembly being mounted in such a way that the timed impulses successively emitted by the generator assure in a repetitive manner the following cycle of effects: the feeding of the first memory by the train of measurement impulses emanating from the tachymetric detector;
  the interrupting of this feeding and the feeding of the second memory by the said train;
  the interrupting of this fresh feeding and the simultaneous application of the outputs of the two memories to the comparator, then the remission to zero of the assembly, the second term in question being the electrical signal provided under these conditions by the comparator;
  the decelerator is of the electrical eddy current type and the means responsive to the exceeding of the level are operated in such a way as to actuate an electrical interrupter connected in series with the electric commutator used for general command of the decelerator or mounted on an electric feed conductor common to different windings of the decelerator;
  the decelerator is of the hydraulic or hydro-kinetic type which causes the intervention of the forced circulation of a liquid and the means responsive to the exceeding of the level are operated in such a way as to activate an electrical interrupter mounted in the excitation circuit of an electromagnetic valve suitable for controlling the circulation of the said liquid.

The invention includes, apart from these principal features, certain other features which are preferably used at the same time and which will be explained in more details hereafter.

A preferred embodiment of the invention will hereafter be described with reference to the accompanying drawings, naturally in a non-limitative manner.

In the drawings:

FIG. 1 is a schematic diagram of a control device of an electrical decelerator for a heavy goods vehicle, in accordance with the invention, FIG. 1A is a schematic diagram of an alternative embodiment of part of the control device shown in FIG. 1, the part not shown being identical to that of FIG. 1, and FIG. 2 is a graph illustrating the operation of the device.

The heavy goods vehicle under consideration comprises, on the one hand, friction brakes which are operable by the driver of the vehicle, and, on the other hand, an eddy electric current decelerator also operable by the driver.

In FIG. 1, the decelerator is shown schematically by a coil 1 through which electrical current flows from a battery 2 for furnishing eddy currents in a disc 3 of magnetic material. This disc is connected for rotation to the transmission shaft 4 of the vehicle, notably to a section of this shaft situated between the gearbox and the axle of the vehicle. The flow of current is controlled by a relay 5 itself energized by a source of direct current 6 upon the closing of a control interrupter 7.

It is this switch or interrupter 7 which is operated by the driver of the vehicle, by foot or by hand, its closing ensuring the creation in the rotating disc 3 of eddy currents which are converted into heat and result in the deceleration of this disc and of the transmission shaft with which it is rigid and thus the wheels of the vehicle which are connected to the shaft.

These different elements are well known to technicians and will not be further described here.

As already indicated, it is proposed, in accordance with the invention, to neutralize automatically the energization of the decelerator when the deceleration of the vehicle exceeds a predetermined level or value.

The value of this level is higher than the maximum deceleration capable of being obtained by the decelerator of the vehicle when the latter is moving at full load and naturally less than the maximum deceleration when the vehicle is moving empty or lightly loaded.

In practice the device gives rise to an absence of any result when the vehicle is loaded and the friction brakes are not applied, the decelerator being able to work normally with full force.

On the other hand, when the vehicle moves in an empty or lightly charged condition, the decelerating effect of the decelerator remains sufficient, being capable generally of exceeding the maximum possible deceleration under full load, but it is automatically limited in such a way as not to approach values which might lead to skidding or loss of traction.

It is important to note that this limitation is systematic: it is not left to the initiative of the driver of the vehicle, and so avoids all risks of forgetfulness or error of appreciation or of a misfortunate reaction on the part of the driver.

It is furthermore important to note that the device thus defined cannot in any way be compared with conventional "anti-skidding" devices mentioned above which bring into play the detection of a seizing of each wheel of the vehicle for the purpose of neutralizing the friction braking of that wheel: there is no question with the present device of allowing the wheels to decelerate to the point of seizing, nor of monitoring them individually, nor of operating upon the friction brakes.

In the present embodiment, the means employed for assuring the desired neutralization of the decelerator are operated in such a way as to cut automatically the flow of current to the coil 1 when the deceleration of the vehicle exceeds a predetermined level: this cutting can be ensured by the opening of an electric switch 8 connected in series with the switch 7 (FIG. 1) or of an electric switch 9 connected in series with the relay 5 (FIG. 1A).

In the embodiment represented in FIG. 1, the cut-out means in question comprise:

- a member 10 (pulley, toothed wheel or the like) connected for rotation to the driven wheels of the vehicle, notably to the transmission shaft 4, the member 10 being advantageously situated in the vicinity of the gearbox;
- a device 11 associated with the member 10 for producing a train of electric "measurement" pulses of which the number per unit of time is proportional to the speed of rotation of the member;
- preferably a counter 12 for counting the pulses;
- a timer 13 for emitting a train of standard timed pulses preferably spaced one from another by a constant time interval;
- two memory units 14 and 15 both of whose inputs are connected to the output of the counter 12 or the device 11, which memory units are suitable for providing respectively two electric potentials $V_1$ and $V_2$ proportional to the number of measurement pulses applied at their inputs;
- a comparator 16 fed from the outputs of the two memory units 14 and 15 and suitable for providing a signal S which is a function of the difference or of the quotient between the two potentials $V_1$ and $V_2$;
- and a bistable circuit 17 responsive to the signal S and associated with the switch 8 or 9 so as to open or close the switch whenever the signal S exceeds the value of a predetermined level $S_o$ (which can be zero) or which is on the contrary less than or equal to this level.

The assembly operates as follows.

The timer 13 transmits the standard time impulses successively to the memory units 14 and 15 and to the comparator 16 and then in turn to the subassemblies 14, 15 and 16 and so on in this way in such a manner as to trigger successively and in a repetitive manner the operations of the three sub-assemblies.

If, for example, three of the time impulses are emitted respectively at times O, $T_o$ and $2T_o$, the first pulse triggers the memory unit 14 and admits at its input the measurement pulses provided by the chain 10, 11, 12, so as to produce from them a potential $V_1$ proportional to the number of these impulses emitted from time zero to time $T_o$.

The second pulse operates at the same time to stop the feeding of the memory unit 14 by the time impulses, to retain in the memory unit the potential $V_1$ produced by it and to transmit to the memory unit 15 the said time impulses, whih causes the production in the memory unit 15 of a new potential $V_2$ proportional to the number of pulses admitted in the latter from time $T_o$ to $2T_o$.

Finally, at time $2T_o$, the third impulse cuts the feeding of the measurement pulses to the memory unit 15 and simultaneously applies to the comparator 16 the two potentials $V_1$ and $V_2$ provided by the memory units 14 and 15: this comparator provides therefore a signal S which is here a function of the difference U between the two potentials $V_1$ and $V_2$.

It is the signal S which is applied to the bistable circuit 17.

At the end of time $3T_o$, the circuit assembly is returned to zero and the cycle above described re-commences.

The two potentials $V_1$ and $V_2$ strictly represent the mean value of the speed monitored respectively through two successive time intervals of identical duration: the difference $V_1$ minus $V_2$, that is to say the differential potential U, is therefore in its turn strictly representative of the variation of the said mean speed between the two time intervals under consideration.

If this potential U is negative, the vehicle is accelerating; if the potential is zero, the speed is constant; if, finally, the potential U is positive, the vehicle is decelerating, and the higher the deceleration the higher the potential U.

A value is determined of the level or upper limit of this deceleration above which there is a risk of skidding or slipping when the vehicle is empty or lightly loaded, on a ground surface which has a weak coefficient of adherence.

As mentioned above, this ceiling value is advantageously comprised between 0.8 and 3 $m/s^2$, being notably of the order of 1 $m/s^2$ for an articulated vehicle of 38 tons (fully loaded, which corresponds to a useful load of 27 tons); and of the order of 1.5 $m/s^2$ for the rear axle of a motor coach.

To the value of the deceleration upper limit above defined there will correspond a ceiling value $U_o$ of the differential potential U.

It is this potential U which is utilized to provide from the comparator 16 a signal S.

The signal S can, depending upon whether the value of the potential U surpasses or does not surpass the value $U_o$, in a first instance exist or not exist, in a second instance exceed or not a corresponding upper limit value $S_o$.

It is noted that the first instance becomes the second upon a chosen condition of a zero for the upper limit value $S_o$.

The signal S is applied to the bistable circuit 17 which is regulated in accordnce with the value $S_o$ in this sense:

that it finds itself in a first state corresponding to the closure of the control switch (8 or 9) when the signal S applied at its input remains less than or equal to the value $S_o$, and that, on the contrary, it flips into a second state ensuring the opening of the said switch when the signal S exceeds the upper limit value $S_o$.

The circuit 17 reverts thereafter to its first state when the signal S returns to a level less than or equal to the value $S_o$.

The arrows 18 and 19 of FIGS. 1 and 1A, respectively represent the means for exploiting the output potential of the bistable circuit 17 for actuating the switch 8 or 9 under consideration, through the utilization notably of an electromagnet actuated by the said output potential.

In the graph of FIG. 2, the abscissa represents time and the ordinate the electric potentials provided respectively by the three sub-assemblies 14, 15 and 16.

For the purpose of simplification, it is supposed in this graph:

that the potential $V_1$ corresponds to the application of five measurement pulses to the input of memory 14 during a time interval $T_o$ and that it is formed by the addition of a number of incremental potentials v, this potential $V_1$ being for example 5 v, and that the potential $V_2$ is formed similarly by the application of four measurement pulses at the input of memory unit 15 during a time interval $T_o$ consecutive to the first, this potential $V_2$ being equal thus to 4 v.

The differential potential U is therefore equal, in this example, to v.

It is desirable for the response time of the device to be short.

This is why in practice the complete cycle above should be less than a second, which implies that the intervals $T_o$ are at the most equal to $\frac{1}{3}$ of a second.

Purely as an illustration, the rotary member 10 which provides the measurement pulses can be arranged to make a rotation when the vehicle progresses through one meter and to produce six pulses for a rotation: in this case, if the time $T_o$ is equal to $\frac{1}{3}$ of a second, the number of measurement pulses produced for each interval time $T_o$ is equal to forty when the speed of the vehicle is equal to seventy-two km/h.

If therefore there is chosen as the deceleration ceiling for activating the device, a reduction in speed of the order of ten km/h during time $T_o$, that is to say in this example, in $\frac{1}{3}$ of a second, the ceiling corresponds to a reduction of about six pulses from the first time interval $T_o$ to the following, that is to say an upper limit value $U_o$ of the order of 6 v, under the above conditions.

The circuit 17 is advantageously arranged so that the upper limit value $U_o$ upon which depends the flipping is easily adjustable at will, thereby permitting adjustment of the sensitivity of the device according to the type of vehicle to be equipped.

The different electronic sub-assemblies 12 to 17 described above are constituted preferably by integrated circuit logic elements, which are particularly reliable and conveniently small.

If it appears preferable for the intervals providing the two potentials $V_1$ and $V_2$ to be the same, for facilitating their comparison, it is not necessary for the duration of the comparison between the two potentials $V_1$ and $V_2$ to be identical to the respective source intervals: this duration can on the contrary be much smaller than those and the timer 13 can be constructed accordingly.

In the same way, a special time interval, equally very short and determined by the timer 13, can be provided independently of the others in order to ensure the return to zero of the three sub-assemblies 14, 15 and 16 after the comparison and before the commencement of the cycle following that comparison.

The chain of sub-assemblies 11 to 16 above described may be replaced by another chain comprising successively a tachymetric generator associated with the rotating member 10 so as to create a potential W proportional to the speed of this member, and a differentiator fed by this potential W and suitable for producing at each instant a potential G of which the value is equal to the derived function of the potential W by reference to time. This potential G, which is proportional to variations in speed of the member 10, or a signal produced in dependence upon the potential G, is applied to the input of the bistable circuit 17 and plays a part as developed above in relation to signal S.

It is possible in all cases to profit from the fact that there is utilized a potential ($V_1$, $V_2$ or W), dependent upon the speed, as a control, for systematically putting out of service the decelerator whenever the speed falls below a predetermined lower limit, for example set at five km/h.

The elements constituting the electric decelerator and its control may be different from those indicated by the reference numerals 1 to 9 in the simplified diagram of FIG. 1: in particular it is possible to provide a temporary hold between the control switch 8 or 9 and the activation circuit of the relay 5 for the purpose of avoiding a return into action of the decelerator too quickly following a cut in its actuation. Furthermore the automatic decelerator capable of being neutralized according to the invention may be of a type other than electric and in particular of a hydraulic or hydro-kinetic type, the interrupter controlled by the bistable circuit 17 or analogous circuit being in this case advantageously mounted on the activation circuit of an electro-magnetic valve appropriate for controlling the force circulation of a liquid in the decelerator and add an appropriate point in its closed circuit, for example at the exit point of the decelerator.

Finally, whatever the embodiment adopted, there is obtained a control device for the decelerator of a heavy goods vehicle which functions as follows: given that the deceleration of the vehicle exceeds a predetermined value, which takes place only whenever the vehicle moves in an empty or lightly loaded condition and the friction brakes are not applied, the decelerator in question is automatically put out of action and this results whether the deceleration is the result of an action of the decelerator or the result of friction braking.

In this way there is avoided all risk of skidding under the action of the decelerator when the vehicle is moving in an empty or lightly loaded condition, and this is particularly advantageous when this action is controlled by means of the brake pedal which is itself at its dead course.

It goes without saying and results from what has been described above that the invention is not limited to the embodiments which have been specially described; it embraces on the contrary all variations notably:

- those in which means are provided for momentarily putting out of circuit the neutralization device of the invention, for example when the vehicle is driven in a half-loaded condition,
- those where a tachymetric detector is used and this like the decelerator is connected to a non-driven shaft of the vehicle under consideration, for example the axle of an articulated vehicle,
- those where the deceleration is detected by means other than those described above, and notably by means which are independent of the speed of the vehicle and which may exploit the inertia of an appropriate mass, whether solid or liquid, mounted on the vehicle and suitable for opening or closing an electric switch according to its position.

I claim:

1. A device for controlling a vehicle having friction brakes, a decelerator, and means for selectively actuating said decelerator; said device comprising: means for automatically neutralizing said selectively actuating means in response to the deceleration of said vehicle exceeding a predetermined value, said perdetermined value being a level of deceleration which would be likely to cause skidding of the vehicle in an empty or lightly loaded condition but not in a full or heavily loaded condition.

2. A device according to claim 1 characterised in that the value of the said predetermined value is within the range 0.8 to 3 m/s$^2$.

3. A device according to claim 1 characterised in that the value of the predetermined value is of the order of 1 to 1.5 m/s$^2$.

4. A device according to claim 1; wherein said means for automatically neutralising comprises a tachymetric detector suitable for providing a first electric term which is variable in the same sense as the speed of the vehicle; means for providing from the first term a second electric term variable with time in the same sense as the variation of the said speed; and means responsive to the exceeding of a predetermined value by the second term, the predetermined value of the second term corresponding to the said predetermined value for the deceleration of the vehicle, for temporarily stopping the energisation of the decelerator when the second term exceeds the value to which it corresponds and for resuming energisation of the decelerator when the second term falls again below the said value.

5. A device according to claim 4 characterised in that the first term is constituted by a train of measurement pulses of which the number per unit time is proportional to the speed of the vehicle, and in that the means for providing the second term comprises a generator (13) for generating time pulses, two meemory units (14, 15) for providing electric potentials proportional to the number of measurement pulses applied to them during a given time, and a comparator (16) for providing an electric signal (S) which constitutes said second term and which is a function of the difference or the quotient between two potentials applied to it, whereby the time pulses successively emitted by said generator ensure in a repetitive manner the sequential feeding of the first memory unit (14) by the train of measurement pulses derived from the tachymetric detector (10–12), followed by cutting of this feed and the feeding of the second memory unit (15) by the said train of measurement pulses, followed by cutting of this new feed and application simultaneously of the outputs of the two memory units to the comparator (16), and finally followed by return to zero.

6. A device according to claim 4, characterised in that the first term is an electric potential proportional to the speed of a member connected for rotation to the wheels, and in that the means for providing the second term are constituted by a differentiator fed by the said electric tension and suitable for providing an electric tension which constitutes the said second term and of which the value is derived with reference to time from the said electric feed tension.

7. A device according to claim 6 characterised in that the means responsive to the exceeding of the value are constituted by a bistable element (17) associated with an electromagnet suitable for energising an electric contact.

8. A device according to claim 5 characterised in that the means responsive to the exceeding of the value are constituted by a bistable element (17) associated with an electromagnet suitable for energising an electric contact.

9. A device according to claim 4 characterised in that the decelerator is of the electrical eddy current type and that the means responsive to the exceeding of the value are operated so as to activate an electrical interrupter (8, 9) connected in series with the general electrical control (7) of the decelerator or mounted on an electrical feed conductor common to different windings (1) of the decelerator.

10. A device according to claim 4 characterised in that the means responsive to the exceeding of the value are constituted by a bistable element (17) associated with an electromagnet suitable for energising an electric contact.

11. A device according to claim 1; wherein said means for automatically neutralising comprises means suitable for exploiting the inertia of a mass carried by the vehicle for detecting deceleration of the vehicle and means responsive to the exceeding of a predetermined value by the displacements of this mass from its rest position for neutralising the energisation of the decelerator, the said value corresponding to the said predetermined value for the deceleration of the vehicle.

12. A device according to claim 1; wherein said means for automatically neutralizing comprises means for detecting when the deceleration of said vehicle exceeds said predetermined value and providing a corresponding control signal whose duration lasts so long as the detected deceleration exceeds said predetermined value; and wherein said means for selectively actuating said decelerator includes means responsive to the control signal for preventing actuation of said decelerator for only so long as the duration of the control signal.

13. A device according to claim 12; wherein said means responsive to the control signal includes a bistable circuit normally exhibiting one stable output state for enabling actuation of the decelerator and responsive to the control signal for temporarily shifting to another output state for preventing actuation of the decelerator.

14. A device according to claim 12; wherein said means for detecting when the deceleration of the vehicle exceeds a predetermined value comprises pulse generating means for generating pulses the number of which is proportional to the rotational speed of one of the vehicle wheels, timed pulse generating means for generating timed pulses having a constant repetition rate, and means responsive to the timed pulses for counting the number of pulses generated by said pulse generating means in two successive periods of timed pulses and developing said control signal whenever the difference between the number of counted pulses in each of two successive periods exceeds a predetermined number corresponding to deceleration of the motor vehicle in excess of said predetermined value.

15. A device according to claim 14; wherein said means responsive to the timed pulses includes first memory means for memorizing the number of counted pulses during the first of two successive periods and developing a voltage proportional thereto, second memory means for memorizing the number of counted pulses during the second of said two successive periods and developing a voltage proportional thereto, and means for comparing the two voltages and developing therefrom said control signal.

16. A device according to claim 15; wherein said means responsive to the control signal includes a bistable circuit normally exhibiting one stable output state for enabling actuation of the decelerator and responsive to the control signal for temporarily shifting to another output state for preventing actuation of the decelerator.

* * * * *